United States Patent
Steuer et al.

(10) Patent No.: US 10,603,882 B2
(45) Date of Patent: Mar. 31, 2020

(54) MULTILAYER FILM COMPRISING LAYER OF PLASTICIZED POLYVINYL ACETAL WITH REDUCED FLOWABILITY

(71) Applicant: KURARAY EUROPE GMBH, Hattersheim (DE)

(72) Inventors: Martin Steuer, Liederbach (DE); Daniel Wenzlik, Wiesbaden (DE); Takeshi Kusudo, Troisdorf (DE); Philipp Lellig, Troisdorf (DE); Uwe Keller, Avon (FR)

(73) Assignee: KURARAY EUROPE GMBH, Hattersheim (DE)

( * ) Notice: Subject to any disclaimer, the term of this patent is extended or adjusted under 35 U.S.C. 154(b) by 0 days.

(21) Appl. No.: 16/091,724

(22) PCT Filed: Apr. 5, 2017

(86) PCT No.: PCT/EP2017/058160
§ 371 (c)(1),
(2) Date: Oct. 5, 2018

(87) PCT Pub. No.: WO2017/174682
PCT Pub. Date: Oct. 12, 2017

(65) Prior Publication Data
US 2019/0152208 A1 May 23, 2019

(30) Foreign Application Priority Data

Apr. 8, 2016 (EP) ..................................... 16164394

(51) Int. Cl.
| | | |
|---|---|---|
| *B32B 17/10* | (2006.01) | |
| *B32B 27/08* | (2006.01) | |
| *B32B 27/22* | (2006.01) | |
| *B32B 27/30* | (2006.01) | |

(52) U.S. Cl.
CPC ...... *B32B 27/306* (2013.01); *B32B 17/10568* (2013.01); *B32B 17/10596* (2013.01); *B32B 17/10761* (2013.01); *B32B 27/08* (2013.01); *B32B 27/22* (2013.01); *B32B 27/30* (2013.01); *B32B 2250/03* (2013.01); *B32B 2250/24* (2013.01); *B32B 2307/102* (2013.01); *B32B 2307/56* (2013.01); *B32B 2605/00* (2013.01)

(58) Field of Classification Search
CPC ....... B32B 27/306; B32B 27/30; B32B 27/08; B32B 17/10761; B32B 17/10577; B32B 17/10587; B32B 17/1058; B32B 2250/03; B32B 2250/24; B32B 17/1055
See application file for complete search history.

(56) References Cited

U.S. PATENT DOCUMENTS

| | | | |
|---|---|---|---|
| 4,287,107 A | * | 9/1981 | Hermann .......... B32B 17/10577 428/437 |
| 4,626,072 A | | 12/1986 | Clerc et al. |
| 4,751,266 A | | 6/1988 | Hermann et al. |
| 4,970,245 A | | 11/1990 | Futami et al. |
| 5,559,175 A | | 9/1996 | Kroggel et al. |
| 6,801,652 B1 | | 10/2004 | Stanzl et al. |
| 7,842,395 B2 | * | 11/2010 | Lu ..................... B32B 17/10339 428/525 |
| 8,053,504 B1 | | 11/2011 | Rymer et al. |
| 2005/0256258 A1 | | 11/2005 | Keller |
| 2006/0263608 A1 | * | 11/2006 | Choi ......................... B32B 3/26 428/426 |
| 2007/0009714 A1 | * | 1/2007 | Lee .................. B32B 17/10568 428/172 |
| 2011/0155205 A1 | | 6/2011 | Steuer et al. |
| 2013/0074910 A1 | * | 3/2013 | Isoue ................. B32B 17/10036 136/251 |
| 2013/0273378 A1 | | 10/2013 | Iwamoto et al. |
| 2017/0043557 A1 | | 2/2017 | Kobayashi |

FOREIGN PATENT DOCUMENTS

| | | |
|---|---|---|
| EP | 0 123 568 B1 | 5/1987 |
| EP | 0185863 B1 | 5/1989 |
| EP | 1 118 258 B1 | 7/2001 |
| EP | 2 660 216 A1 | 6/2013 |
| GB | 2 007 677 A | 5/1979 |
| JP | H02123103 A | 5/1990 |
| JP | H051109 A | 1/1993 |

* cited by examiner

*Primary Examiner* — Joanna Pleszczynska
(74) *Attorney, Agent, or Firm* — Brooks Kushman P.C.

(57) ABSTRACT

A multilayer laminating film contains at least one first and one second layer of plasticized polyvinyl acetal, wherein the first layer comprises a first plasticizer and a first polyvinyl acetal with a degree of acetalization of 75.1-84.0 mol % and a molar ratio of continuous sequences of vinyl alcohol groups with 5 members with a stereochemical sequence of rrrr of more than 0.23 based on the total amount of continuous syndiotactic sequences of vinyl alcohol groups with 3 members in the polyvinyl acetal, and the second layer comprises a second plasticizer and a second polyvinyl acetal with a degree of acetalization of 60-84 mol %.

13 Claims, 4 Drawing Sheets

Figure 1:
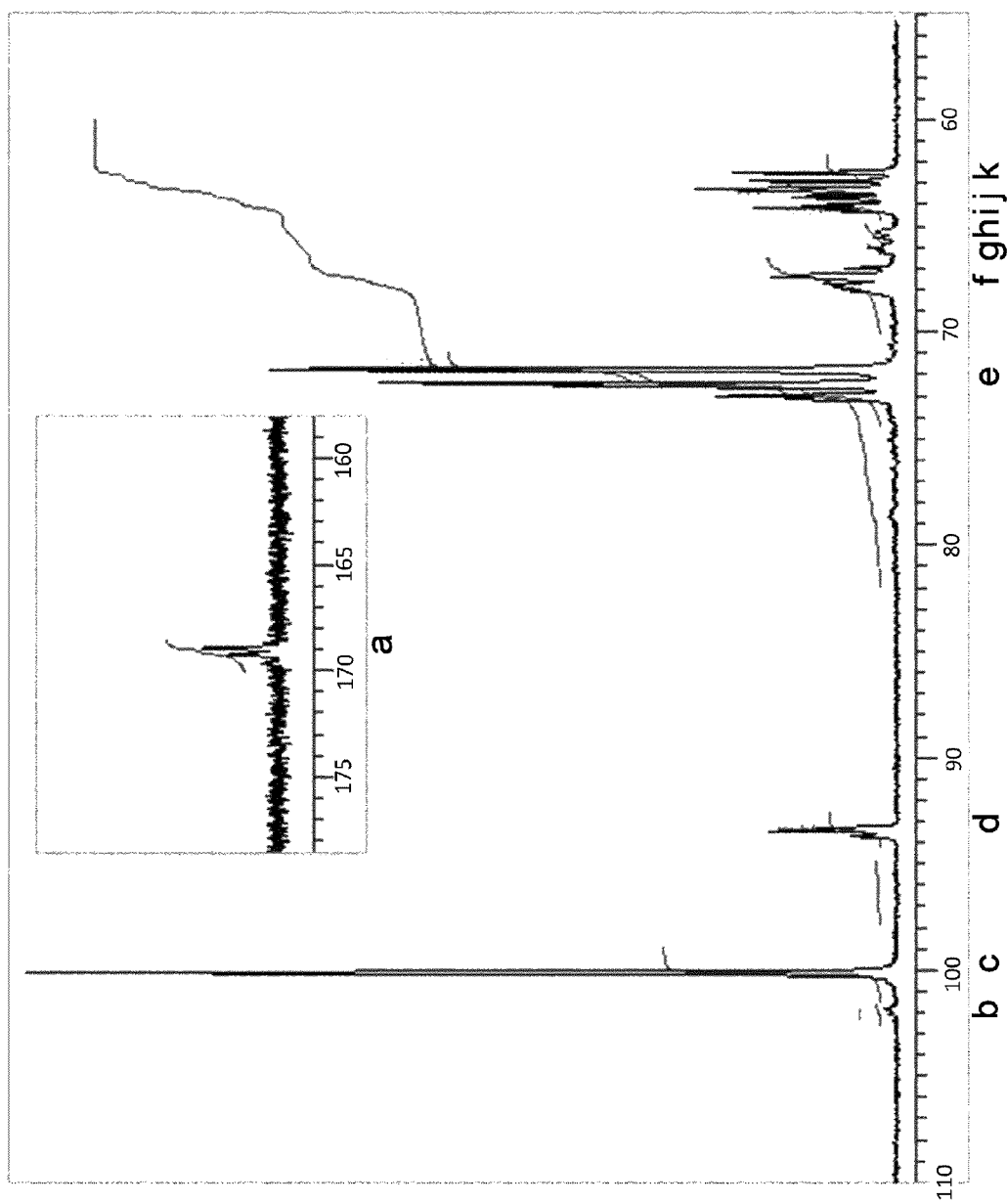

MULTILAYER FILM COMPRISING LAYER OF PLASTICIZED POLYVINYL ACETAL WITH REDUCED FLOWABILITY

CROSS REFERENCE TO RELATED APPLICATIONS

This application is the U.S. National Phase of PCT Appln. No. PCT/EP2017/058160 filed Apr. 5, 2017, which claims priority to European Application No. 16164394.5 filed Apr. 8, 2016, the disclosures of which are incorporated in their entirety by reference herein.

BACKGROUND OF THE INVENTION

1. Field of the Invention

The invention relates to a multilayer film comprising at least one layer of plasticized polyvinyl acetal with reduced flowability.

2. Description of the Related Art

Plasticized polyvinyl butyral has long been known as an intermediate layer for laminated safety glasses for architectural and automobile application as well as an adhesive film for photovoltaic modules.

In order to provide laminated safety glasses with sound damping properties, it is known to provide interlayer films comprising at least two layers of plasticized polyvinyl butyral having different mechanical properties. The different mechanical properties of the layers dissipate the mechanical energy of the sound waves which leads to sound damping. The different layers are provided with different mechanical properties by using different amounts or types of plasticisers and/or different polyvinyl butyrals.

In order to adjust the mechanical or physical properties of polyvinyl acetals, the molecular structure of its polymer chain was studied with regard to composition (degree of acetalisation, residual acetate content and residual alcohol content), chain length, aldehyde used and compatibility with different plasticizers.

Further studies were made to adjust the physical properties of polyvinyl acetals in view of the sequence of the repeating units of the polymer chain, i.e. acetal unit, acetate units and especially vinyl alcohol units.

For example, GB 2007677 discloses a process for the manufacture of polyvinyl acetals in which the sequence of repeating units in the polyvinyl acetal chain is "frozen" as not being in thermodynamic equilibrium. For this purpose, emulsifiers are used in the acetalisation reaction, which affects the sequence of groups in the polymer chain.

The use of emulsifiers to affect the polymer chain is furthermore disclosed in U.S. Pat. Nos. 8,053,504 and 4,970,245. In the process according to U.S. Pat. No. 4,970,245, low acetalisation temperatures are utilized to prevent the sequence of repeating units in the polyvinyl acetal from being in thermodynamic equilibrium.

On the contrary, U.S. Pat. No. 8,053,504 describes only acetalisation temperatures of at least 80° C. to control the polymer sequence. The sequence of repeating units of a polyvinyl acetals produced under such conditions (i.e. high reaction temperatures) are in thermodynamic equilibrium.

JP 3036894 discloses a process for production of polyvinyl butyral having a degree of acetalisation of 65-75 mol %, which comprises a two-step addition of acid catalyst and a reaction temperature of at least 69° C. The resulting polyvinyl butyral is characterized by the respective amount of heterotactic, syndiotactic and isotactic triades of hydroxyl groups. The polyvinyl acetal disclosed in JP 3036894 has an enhanced flowability, which is attributed to the amount of hydroxyl groups grouped in 3, 4 and 5 membered chains and the stereochemistry of the 3-membered chains.

In another example for enhancing flowability of polyvinyl acetal and plasticized films thereof, US20110155205A1 discloses polyvinyl acetal with high flowability and plasticizer-containing films made thereof. High flowability results in a viscosity (<75 mPas) of the polyvinyl acetal and high melt flow rate MFR of the plasticized polyvinyl acetal (i.e. the film) with MFR(100) of more than 500 mg/10 min. Such plasticized polyvinyl acetals or films have a reduced mechanical stability and are difficult to coextrude with plasticized polyvinyl acetal mixtures having different mechanical stability (i.e. melt flow rates MFR). Without being bound to any theory, this reason for the high flowability of polymers described in US20110155205A is the low concentration of acidic catalyst utilized in the acetalization process.

The prior art discussed above is concerned with enhancing the flowability of polyvinyl acetals, i.e. to achieve higher flowability. While this is beneficial for certain applications, a reduced flowability is desired in other circumstances. For example, reduced flowability would result in plasticized films made from such material with more rigid behaviour and/or improved mechanical stability.

An improved mechanical stability is beneficial for example for use in multilayer interlayer materials where layers of different flowability are combined. At the interface of multilayer films with the different layers of different/too high flowability, excessive air that is trapped in the laminate is likely to agglomerate at the interface and lead to the formation of bubbles and so called iceflowers.

Also, in multilayer laminates with one layer having a flowability which is too high, upon increased temperature, time and/or load, one glass pane may slip off in the case when both glass panes are not fixed. This so called creep-effect then leads to a displacement between a fixed back pane and a loose front glass pane.

In this regard, EP2660216A1 discloses multilayer films wherein the layers comprise chemically different polyvinyl acetals, thereby giving the layers different mechanical stability which has an impact on sound damping properties. However, EP2660216A1 is silent on the secondary structure of the polyvinyl acetal and the resulting mechanical properties as expressed by, for example, viscosity and melt flow rates MFR.

The object of the present invention was therefore to provide polyvinyl acetals with reduced flowability for producing layers for multilayer plasticizer-containing films.

SUMMARY OF THE INVENTION

It was found that the rheological properties of polyvinyl acetal or plasticized films produced therefrom can be adjusted by manipulating the secondary structure of the polymer chain. This can be examined in a simple manner by $^{13}$C-NMR measurements.

Layers comprising polyvinyl acetal with reduced flowability have different mechanical properties than layers comprising different polyvinyl acetal. Accordingly, layers comprising polyvinyl acetal with different flowability can be combined to provide multilayer films with sound-damping properties. It was object of the invention to provide such layers.

DETAILED DESCRIPTION OF THE PREFERRED EMBODIMENT

The present invention therefore relates to a multilayer film comprising at least one first and one second layer of plasticized polyvinyl acetal wherein the first layer comprises a first plasticizer and a first polyvinyl acetal with a degree of acetalization of 75.1-84.0 mol % and a molar ratio of the amount of continuous sequences of vinyl alcohol groups with 5 members with a stereochemical sequence of rrrr of more than 0.23 based on the total amount of continuous syndiotactic sequences of vinyl alcohol groups with 3 members in the polyvinyl acetal and the second layer comprises a second plasticizer and a second polyvinyl acetal with a degree of acetalization of 60-84 mol %.

The first polyvinyl acetal has a reduced flowability as compared to the second polyvinyl acetal and is preferably produced as disclosed in this application. The second polyvinyl acetal can be produced by any method according to the prior art or as disclosed in this application In a first variant, the multilayer film according to the invention may comprise at least one first layer and at least two second layers, wherein one first layer is embedded between two second layers.

In a second variant, the multilayer film according to the invention may comprise at least two first layers and at least one second layer, wherein a second layer is embedded between two first layers.

The flow behaviour of polyvinyl acetal is highly dependent on the formation of vinyl alcohol domains and the stereochemistry of the hydroxyl groups within these domains.

The first polyvinyl acetal is characterised by the stereochemistry of continuous syndiotactic sequences of vinyl alcohol groups with 5 members. The stereochemistry of such groups is shown in the following formulas 1-3:

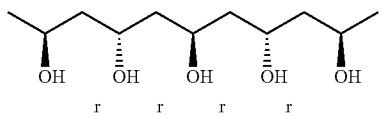
(1)

Continuous syndiotactic sequences of vinyl alcohol groups with 5 members according to formula (1) are referred to as "rrrr" groups.

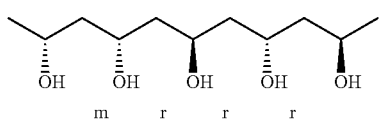
(2)

Continuous syndiotactic sequences of vinyl alcohol groups with 5 members according to formula (2) are referred to as "mrrr" groups.

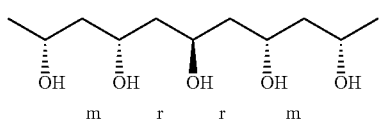
(3)

Continuous syndiotactic sequences of vinyl alcohol groups with 5 members according to formula (3) are referred to as "mrrm" groups.

In a first embodiment of the invention, the first polyvinyl acetal is further characterized by a molar ratio of the amount of continuous sequences of vinyl alcohol groups with 5 members with a sterochemical sequence of mrrm (meso/racemo/racemo/meso) of less than 0.4 based on the total amount of continuous syndiotactic sequences of vinyl alcohol groups with 3 members in the polyvinyl acetal.

In a second embodiment of the invention, the first polyvinyl acetal may have a molar ratio of the amount of continuous sequences of vinyl alcohol groups with 5 members with a sterochemical sequence of rrrr (racemo/racemo/racemo/racemo) of more than 0.23, preferred more than 0.25 with an upper limit of 0.33 based on the total amount of continuous syndiotactic sequences of vinyl alcohol groups with 3 members in the polyvinyl acetal.

In a third embodiment of the invention, the first polyvinyl acetal may have a molar ratio of syndiotactic sequence of vinyl alcohol groups with 3 members of at least 0.130 based on the total of vinyl alcohol groups in the polyvinyl acetal, preferably at least 0.150, more preferably at least 0.180, in each case with an upper limit of 0.250.

In a forth embodiment of the invention, the first polyvinyl acetal may have a content of continuous syndiotactic sequence of vinyl alcohol groups with 3 members of at least 2.5 mol %, preferably at least 3.0 mol %, in each case with an upper limit of 6 mol % based on whole of groups consisting of vinyl alcohol group, vinyl acetal group and vinyl acetate group in the polyvinyl acetal.

In a fifth embodiment of the invention, the first polyvinyl acetal may have a molar ratio of the amount of continuous sequences of vinyl alcohol groups with 5 members with a sterochemical sequence of mrrm (meso/racemo/racemo/meso) of less than 0.4 preferred less than 0.29 and at least 0.20 based on the total amount of continuous syndiotactic sequences of vinyl alcohol groups with 3 members in the polyvinyl acetal.

First and or second polyvinyl acetals used in the invention preferably have the same or different residual acetate content of 0.1-8 mol %, more preferably 0.2 to 5.0 and in particular 0.2 to 2.0 mol %. In a preferred variant of the invention, the residual acetate content is between 0.15 and 1.2 mol %.

The residual acetate content of the polyvinyl acetals may be identical to that of the polyvinyl alcohols used. In another embodiment of this invention, the residual acetate content of the polyvinyl acetals is reduced by post-saponification.

Polyvinyl alcohols used to prepare first and/or second polyvinyl acetals have the same or different viscosity-average degrees of polymerization (DP) between 500 and 2500, preferably between 1500 and 2300, most preferably between 1600 and 2000. Single polyvinyl alcohols or mixtures of at least two different polyvinyl alcohols may be used. Accordingly, first and/or second polyvinyl acetals have the same or different viscosity-average degree of polymerization (DP) of less than 2500, preferably between 500 and 2500, more preferably between 1500 and 2300, and most preferably between 1600 and 2000.

The flowability of the first and/or second polyvinyl acetal can additionally be expressed via its solution viscosity in a 5% by weight solution in a mixture of 95 parts ethanol and 5 parts water at 20° C. This is preferably more than 80 mPas, more preferably more than 90 mPas, and most preferably more than 110 mPas.

The mechanical properties of a layer can additionally be expressed via the melt flow rate at 100° C. (MFR 100). Multilayer films according to the invention preferably comprise at least one layer wherein a mixture of the first plasticizer (30-40 weight %) and the first polyvinyl acetal has a melt flow rate at 100° C. (MFR 100) of less than 220 mg/10 min. The melt flow rate at 100° C. (MFR 100) should be higher than 2 mg/10 min.

When preparing polyvinyl acetals, at least one polyvinyl alcohol is usually first dissolved in water under elevated temperature (70-99° C.) and then acetalized at a temperature of 0 to 30° C. in presence of an acid catalyst like HCl, $HNO_3$ or $H_2SO_4$ with one or more aldehydes with 2 to 10 carbon atoms. Suitable in this process are for example acetaldehyde, iso-butyraldehyde and n-butyraldehyde.

The polyvinyl acetals used in this invention are preferably prepared in absence of emulsifiers or surfactants, for example sulphonic acid salts such as the sodium salt of dodecyl sulphonic acid, which is used frequently in the prior art.

The first polyvinyl acetal is preferable prepared by acid-catalysed reaction of at least one polyvinyl alcohol with at least one aldehyde, characterised by the following process steps:
a) reacting the polyvinyl alcohol with the aldehyde at a temperature of 0 to 30° C. by addition of an acid catalyst, whereas the ratio of acid catalyst to polyvinyl alcohol is at least 7.5 mol H+ per kg of polyvinyl alcohol,
b) completing the reaction by heating the reaction mixture of a) after complete dosage of the acid catalyst to 69 to 80° C. and keeping the reaction mixture in this temperature range for at least 180 min,
c) cooling the reaction mixture of b) to 15 to 45° C. and separating the polyvinyl acetal, and
d) neutralising the polyvinyl acetal separated from the reaction mixture.

The first polyvinyl acetal thus produced precipitates either during or after the addition of the acid catalyst i.e. in step a) of the process of the invention. The acid or aldehyde can be added in process step a) at different dosing times and/or with a dosing pause. Preferably, in the process of the invention, the polyvinyl acetal precipitates during step a) and at least 5% of the acid catalyst is added before beginning of the precipitation of the first polyvinyl acetal.

The process is preferably carried out at a temperature in process step b) of at least 68° C., more preferably of more than 72° C., in each case with an upper limit of 80° C. This temperature is preferably maintained at least over a period of 20 min.

Independently, the temperature in process step b) may be kept over a period of at least 180 min, preferably more than 210 min, in each case with an upper limit for the holding time of 600 min.

Acetalisation of polyvinyl alcohols is an acid-catalysed reaction, acetal groups being formed as a function of temperature and then breaking down again. The above described process is preferably carried out at a ratio of acid to polyvinyl alcohol of at least 8 mol H+ per kg of polyvinyl alcohol, more preferably more than 9 mol H+ per kg, yet more preferably more than 10 mol H+ per kg, and especially more than 11 mol H+ per kg of polyvinyl alcohol.

As a result of cooling the reaction mixture in step c), the sequence of repeating units in the polyvinyl acetal set in step b) is frozen and is no longer changed by the additional removal of the acid catalyst. The thermodynamic equilibrium of the sequence of repeating units in the polyvinyl acetal obtained in step b) is thus fixed.

In step d) of the process, the first polyvinyl acetal separated from the reaction mixture is neutralised. This may be achieved by adding bases, such as KOH, NaOH, $Mg(OH)_2$ or $NaHCO_3$ and/or by washing with water.

The residual acetate content of the first and/or second polyvinyl acetal can be adjusted by addition of a stoichiometric amount of a strong base to the solution of the polyvinyl alcohol at a temperature between 60 and 99° C. before addition of acid and aldehyde. The strong base effects the saponification of a portion of the original acetate groups of the polyvinyl alcohol, yielding a lower amount of acetate groups in the polyvinyl acetal.

The first and second layer according to the invention may have the same or a different plasticizer content, in the range from 0-60% by weight, based on the total formulation.

The first layer preferably has a plasticizer content of 10-60% by weight, more preferably 20-50%, and most preferably 27-45% by weight, and 90-40 wt % of a first polyvinyl acetal The second layer preferably has a plasticizer content of 10-40% by weight, more preferably 20-35% by weight, and most preferably 25-30% by weight, and 90-60 wt % of a second polyvinyl acetal.

The total plasticizer content of the combined layers is preferably 10 to 42 Weight %, more preferably from 22 to 32% by weight.

The layers may contain one or more plasticizers that are common in this technical field and are known to those skilled in the art. One or more plasticizers are particularly preferable, selected from the group of di-2-ethylhexyl sebacate, 1,2 cyclohexane dicarboxylic acid diisononyl ester, di-2-ethylhexyl adipate, di-2-ethylhexyl phthalate, dioctyl adipate, dihexyl adipate, dibutyl sebacate, di-2-butoxyethyl sebacate, triethyleneglycol-bis-2-ethylhexanoate, triethyleneglycol-bis-n-heptanoate, triethyleneglycol-bis-n-hexanoate, tetraethylene-glycol-bis-n-heptanoate, di-2-butoxyethyl adipate, di-2-butoxyethoxyethyl adipate.

The layers may also contain the same or different adhesion regulators, such as the alkaline and/or alkaline earth salts of organic acids disclosed in WO 03/033583 A1. Potassium acetate and/or magnesium acetate have proven to be particularly suitable. The alkaline and/or alkaline earth metal salts can be used alone or in combination in an amount from 0 to 1000 ppm, particularly 100 to 500 ppm.

The production of films based on plasticizer-containing polyvinyl acetals is known industrially and is described, for example, in EP 185863 B1 or EP 1118258 B1. The processing of these films is also known to the person skilled in the art and can be carried out in "autoclave processes" at an increased pressure of 10 to 15 bar and at temperatures of 130 to 145° C. Alternatively, processing may be carried out in "vacuum bag laminators", "vacuum ring laminators" or "vacuum laminators", for example in accordance with EP 123568 B1 at 200 mbar and 130 to 145° C. These films exhibit a surface structure created by melt fracture or by embossing having a surface roughness Rz bewtween 10 and 100 µm, preferably in the range of 20 to 80 µm.

The films according to the invention can be used to produce laminated glasses for the automobile and construction industries as well as for the production of photovoltaic modules.

In another embodiment of the invention, the multilayer films according to the invention may film exhibit a wedged-shaped profile useful for producing laminated glazing for providing head-up display functionality.

Measuring Procedures:

The flow behaviour of the film is determined as the melt index (melt flow rate MFR) in accordance with ISO 1133 using a corresponding apparatus, for example from Göttfert, model M12. The MFR value is given at the corresponding temperatures with the 2 mm nozzle with weight loadings of 21.6 kg in grams or milligrams every 10 minutes (g/10 min or mg/10 min)

The creep-measurement determines the displacement of one glass pane to the other in a laminated safety glass (LSG). Therefore, a LSG with dimensions of 10×30 cm with a glass thickness of 3 mm and an offset of 20 mm between the front and back glass pane is prepared. A steel weight of 1 kg is attached to the front side by gluing. This laminate is stored standing upright in an oven at 100° C. After 1 week the displacement in mm of the front glass pane is measured relative to its initial position.

The formation of iceflowers can be tested by incorporating an excessive amount of air into a laminated safety glass by punching holes into the PVB film and then test this laminate in a bubble formation test as described in US20130273378. The bubble formation test that was used in the examples and comparative examples was according to test method A as described in US20130273378 and the defect rate was ranked between no/few/many bubbles/iceflowers.

The polyvinyl alcohol and polyvinyl alcohol acetate contents of the polyvinyl acetals were determined in accordance with ASTM D 1396-92. The degree of acetalisation (=butyral content) can be calculated as the remaining portion from the sum of polyvinyl alcohol and polyvinyl acetate content established in accordance with ASTM D 1396-92 needed to make one hundred. Conversion from % by weight into mol % is achieved in accordance with formulae known to the person skilled in the art.

The metal ion content was determined by atomic absorption spectroscopy (AAS).

The solution viscosity of the polyvinyl acetals was measured in accordance with DIN 53015 at 20° C. in a mixture of 95 parts ethanol and 5 parts water. The solid content of the viscosity solution was 5% by weight.

The solution viscosity of the polyvinyl alcohols was measured in accordance with DIN 53015 at 20° C. in water. The solid content of the viscosity solution was 4% by weight.

The acetyl content (AC) of polyvinyl alcohol was calculated from the result of the degree of hydrolysis (DH) of polyvinyl alcohol, which is determined according to the method described in JIS-K6726, according to following formula:

AC (mole %)=100−DH (mole %)

DP (viscosity-average degree of polymerization) of polyvinyl alcohol was determined according to JIS-K6726. Concretely, the polyvinyl alcohol is re-hydrolyzed to a degree of hydrolysis of at least 99.5 mol %, and purified, and its intrinsic viscosity [i] is measured in water at 30° C., and from it, the viscosity-average degree of polymerization (DP) of the polyvinyl alcohol is obtained according to the following formula:

$P=([\eta] \times 10000/8.29)^{(1/0.62)}$

Figure 2:
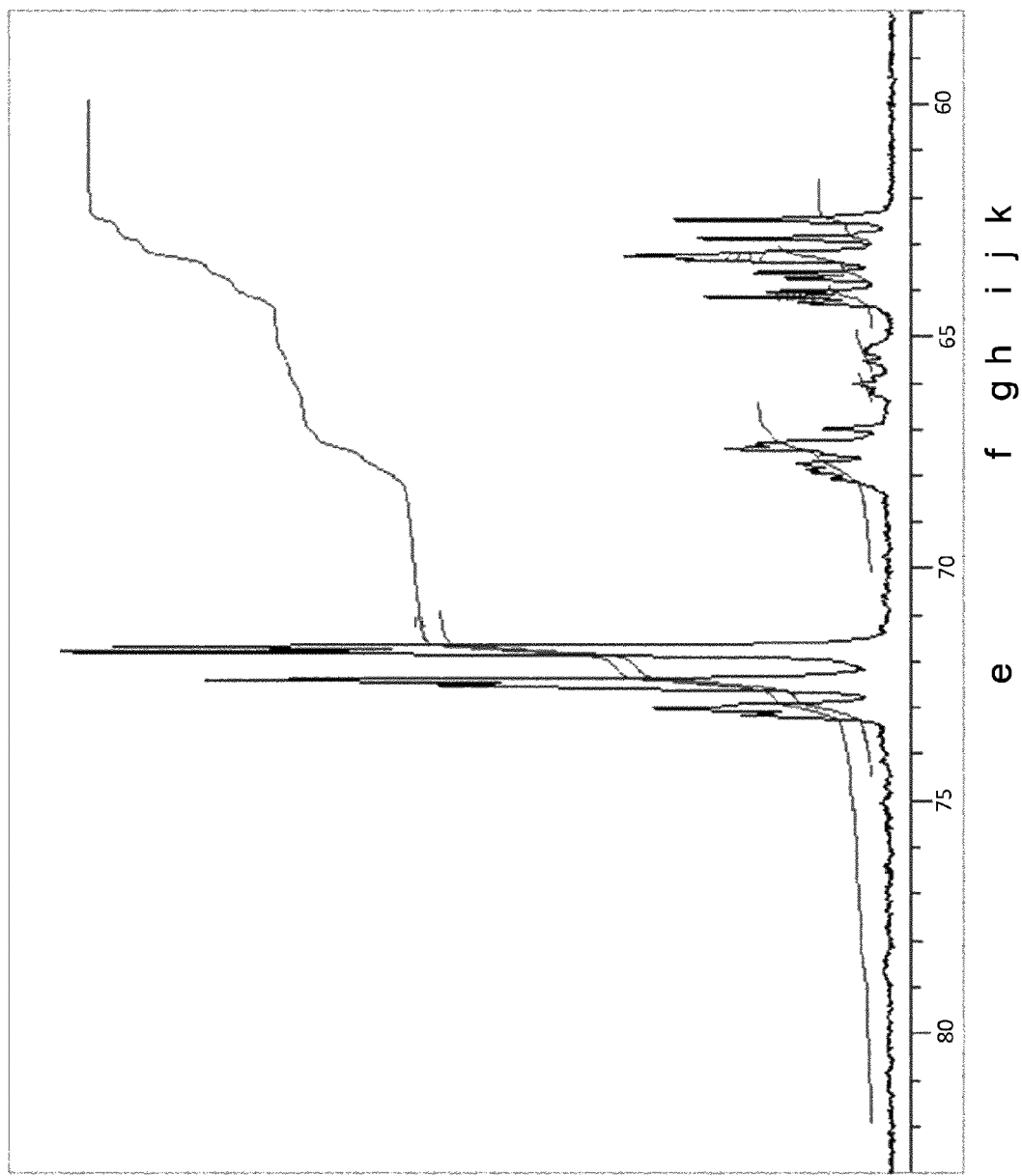
Figure 3:
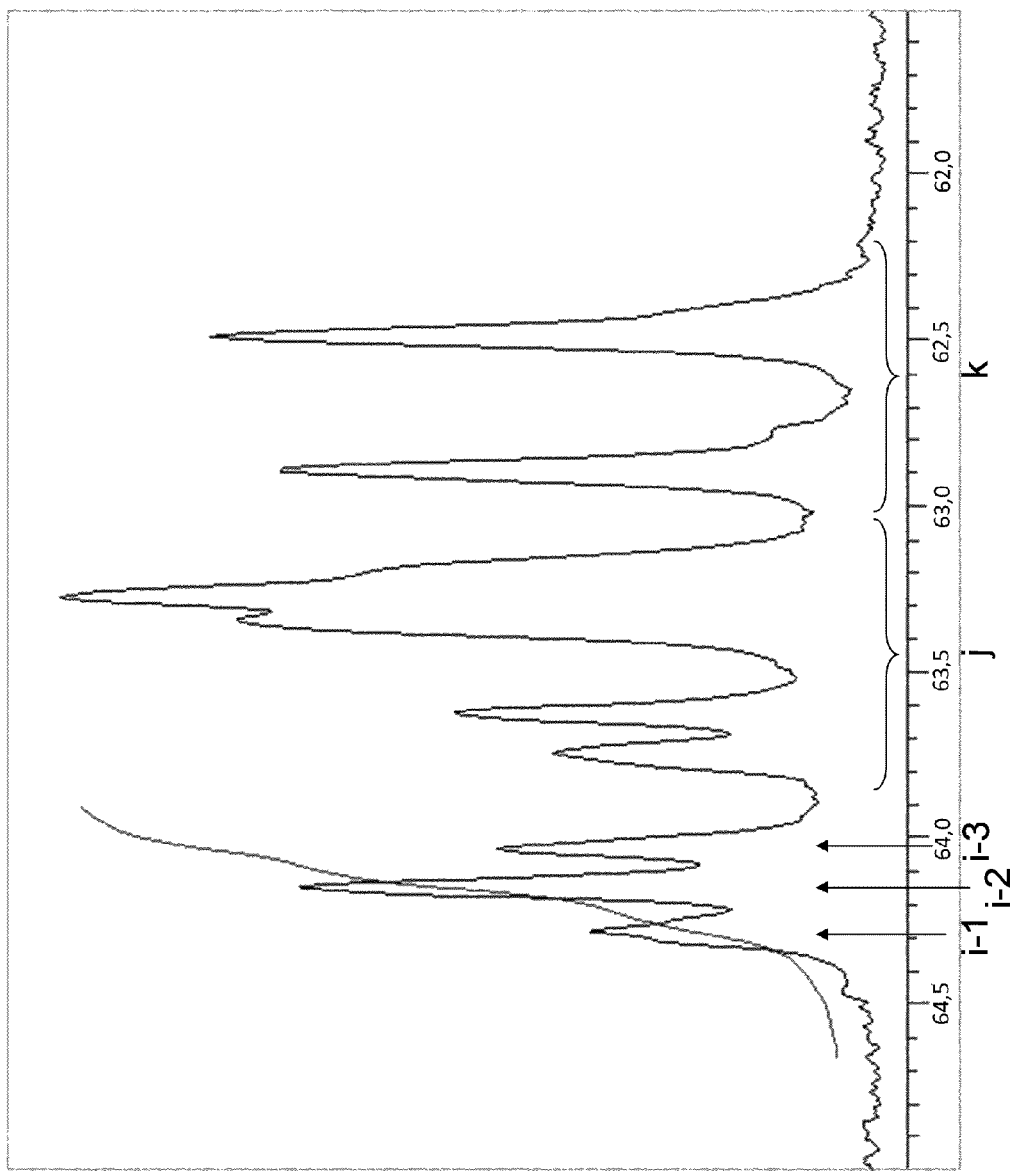
Figure 4:
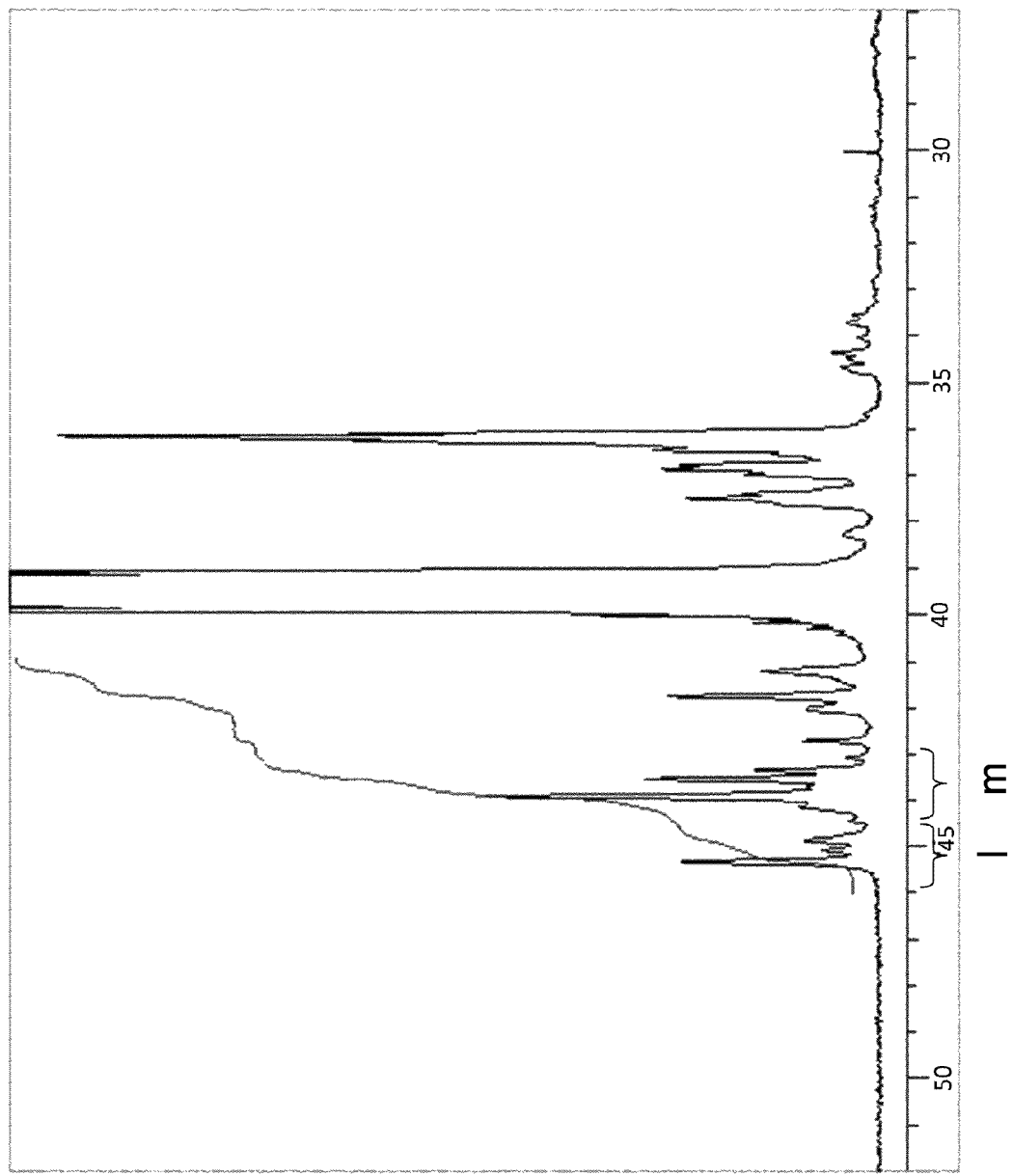

The $^{13}$C-NMR measurements were carried out using a spectrometer of AV 600 type from Bruker. 12% by weight solutions of PVB were produced in deuterated dimethyl sulphoxide (DMSO) in NMR tubes with a diameter of 10 mm. Chromium(III) acetylacetonate was added in an amount of 0.9% by weight as a relaxation agent. The NMR measurement was carried out in the gated decoupled mode at 80° C. The signals were allocated in accordance with FIGS. 1 to 4. The horizontal axis in the figures represents the chemical shift in ppm (resonance frequency DMSO-d6: 39.5 ppm). The vertical axis represents resonance intensity.

The integration limits of the resonance peak are shown in FIGS. 1 to 4 and are shown in table 1. Integration between chemical shifts is given in [ppm].

The expressions shown in table 2 are used as a relative measure for the proportions of different structural units.

TABLE 1

| | | | Range |
|---|---|---|---|
| a | | Carbonyl C-atom of the acetyl group | 168.5-170.5 |
| b | | Methine C-atom of acetal part of the 5-membered butyral ring | 101.6-102.4 |
| c | | Methine C-atom of acetal part of the 6-membered butyral ring having m form | 98.5-101.6 |
| d | | Methine C-atom of acetal part of the 6-membered butyral ring having r form | 91.5-94.5 |
| e | | Methine C-atom of the main chain of the 6-membered butyral ring having m form | 70.9-74.5 |
| f | | Methine C-atom of the main chain of the 6-membered butyral ring having r form and aceme C-atom of the main chain of 3 continuous isotactic vinyl alcohol group (having mm form by triad) | 66.4-70.0 |
| g | | Methine C-atom of the main chin of 3 continuous atactic vinyl alcohol group (having mr form by triad) | 65.8-66.4 |
| h | | Methine C-atom of the main chain of vinyl alcohol between the 6-membered butyral ring and vinyl alcohol of m form | 64.8-65.8 |
| i | | Methine C-atom of the main chain of 3 continuous syndiotactic vinyl alcohol group (having rr form by triad) | 63.9-64.8 |
| | i-a | Methine C-atom of the main chain of syndiotactic vinyl alcohol group having rrrr form by pentad | 64.21-64.7 |
| | i-b | Methine C-atom of the main chain of syndiotactic vinyl alcohol having mrrr form by pentad | 64.08-64.21 |
| | i-c | Methine C-atom of the main chain of syndiotactic vinyl alcohol having mrrm form by pentad | 63.9-64.08 |
| j | | Methine C-atom of the main chain of vinyl alcohol between the 6-membered butyral ring and vinyl alcohol of r form | 63.0-63.9 |
| k | | Methine C-atom of the main chain of vinyl alcohol between the 6-membered butyral rings | 61.6-63.0 |
| l | | Methylene C-atom of a VV-sequence | 44.6-46 |
| m | | Methylene C-atom of VB and BB sequence | 42.9-44.6 |

* m form: meso form, r form: aceme form, mm form: meso/meso form, mr form: meso/aceme form, rr form: aceme/aceme form, rrrr form: aceme/aceme/aceme/aceme form, mrrr form: meso/aceme/aceme/aceme form, mrrm from: meso/aceme/aceme/meso form

TABLE 2

| Calculation method | |
|---|---|
| Molar ratio of syndiotactic sequence of vinyl alcohol group with 3 members based on whole of vinyl alcohol groups | |
| f Methine C-atom of the main chain of 3 continuous isotactic vinyl alcohol group (having mm form by triad) (VmVVm)/(all V) | f – e (c/d) |
| | i/(f + g + h + i + j + k) |
| Content of syndiotactic sequence of vinyl alcohol group with 3 members based on whole of groups consisting viny lalcohol group, vinyl acetal group and vinyl acetate group | |
| A Integral value of whole of methine C-atom of the main chain (VmVVm)/(all groups) (mol %) | Integral value from 60 ppm to 82 ppm i/A × 100 |
| HO blockiness | |
| VV/(VB + BB) | l/m |

* VmVVm: 3 continuous syndiotactic vinyl alcohol, V: vinyl alcohol

In the calculation of Molar ratio of syndiotactic sequence of vinyl alcohol group with 3 members based on whole of vinyl alcohol groups, the base line based on from 60 ppm to 82 ppm is used for calculation of each integral value for signal e to signal k. And in the calculation of HO blockiness, the base line based on from 41 ppm to 46 ppm is used for calculation of each integral value for signal l and signal m.

EXAMPLES

3G8=Triethyleneglycol-bis-2-ethylhexanoate
3G6=Triethyleneglycol-bis-n-hexanoate
DBEA=Bis(2-butoxyethyl)adipate
DBEEA=Bis(2-butoxyethoxyethyl)adipate
DINCH=1,2-Cyclohexane dicarboxylic acid diisononylester
BHT=3,5-Bis(1,1dimethylethyl)-4-hydroxy toluene
PVB=polyvinyl butyral with the given PVA content

Examples

Comparative Example 1

100 parts by weight of the polyvinyl alcohol Mowiol 28-99 (commercial product from Kuraray Europe GmbH) with an Acetyl-content of 0.71 w % were dissolved in 1075 parts by weight of water with heating to 90° C. A solution of 0.156 parts by weight of the oxidation stabilizer BHT in 67.5 parts by weight of n-butyraldehyde was added at a temperature of 40° C. and 110 parts by weight of 20% hydrochloric acid were added with stirring at a temperature of 12° C. within 6 min, after which the polyvinyl butyral (PVB) precipitated. The mixture was then held at 12° C. for a further 15 min with stirring, then heated to 69° C. within 80 min and was held at this temperature for 120 min. The PVB was separated after cooling to ambient temperature, washed neutral with water and dried to a solid content of >%. A PVB with a polyvinyl alcohol content of 14.5% by weight and a polyvinyl acetate content of 1.24% by weight was obtained.

370 g of PVB, 125 g of the plasticizer DINCH, 0.75 g of the UV stabilizer Tinuvin 328, 0.25 g of the oxidation stabilizer Songnox 2450, 0.25 g of a 25% aqueous solution of magnesium acetate tetrahydrate were mixed in a laboratory mixer (manufacturer: Brabender, model 826801) at 20° C. for 5 min. The mixture obtained was extruded to form a flat film with a thickness of 0.8 mm. Extrusion was carried out using a double-screw extruder with screws rotating in opposite directions (manufacturer: Haake, system Rhecord 90), equipped with a melting pump and a sheet die. The cylinder temperature of the extruder was 220° C., the nozzle temperature was 150° C.

Example 1

100 parts by weight of the polyvinyl alcohol according to comparative example 1 were dissolved in 1075 parts by weight of water with heating to 90° C. The aqueous solution of poly vinyl alcohol was saponified to an acetyl content of 0.32 w % at 90° C. by addition of 0.63 parts per weight of sodium hydroxide. A solution of 0.156 parts by weight of the oxidation stabilizer BHT in 61.5 parts by weight of n-butyraldehyde was added at a temperature of 40° C. and 189 parts by weight of 30% nitric acid were added with stirring at a temperature of 12° C. within 10 min, after which the polyvinyl butyral (PVB) precipitated. The mixture was then held at 12° C. for a further 15 min with stirring, then heated to 73° C. within 80 min and was held at this temperature for 240 min. Further work-up was according to comparative example 4. A PVB with a polyvinyl alcohol content of 15.8% by weight and a polyvinyl acetate content of 0.82% by weight was obtained. A film was prepared according to comparative example 1.

Example 2

100 parts by weight of the polyvinyl alcohol according to comparative example 1, were dissolved in 1075 parts by weight of water with heating to 90° C. A solution of 0.156 parts by weight of the oxidation stabilizer BHT in 62.75 parts by weight of n-butyraldehyde was added at a temperature of 40° C. and 189 parts by weight of 30% nitric acid were added with stirring at a temperature of 12° C. within 10 min, after which the polyvinyl butyral (PVB) precipitated. The mixture was then held at 12° C. for a further 15 min with stirring, then heated to 73° C. within 80 min and was held at this temperature for 240 min. Further work-up was according to comparative example 1. A PVB with a polyvinyl alcohol content of 14.75% by weight and a polyvinyl acetate content of 1.49% by weight was obtained. A film was prepared according to comparative example 1.

Example 3

100 parts by weight of the polyvinyl alcohol according to comparative example 1, were dissolved in 1075 parts by weight of water with heating to 90° C. A solution of 0.156 parts by weight of the oxidation stabilizer BHT in 61.5 parts by weight of n-butyraldehyde was added at a temperature of 40° C. and 189 parts by weight of 30% nitric acid were added with stirring at a temperature of 12° C. within 10 min, after which the polyvinyl butyral (PVB) precipitated. The mixture was then held at 12° C. for a further 15 min with stirring, then heated to 73° C. within 80 min and was held at this temperature for 240 min. Further work-up was according to comparative example 1. A PVB with a polyvinyl alcohol content of 15.9% by weight and a polyvinyl acetate content of 1.49% by weight was obtained. A film was prepared according to comparative example 1.

Comparative Example 2

100 parts by weight of the polyvinyl alcohol Mowiol 28-99 (commercial product from Kuraray Europe GmbH) with an Acetyl-content of 0.71 w % were dissolved in 1075 parts by weight of water with heating to 90° C. A solution of 0.156 parts by weight of the oxidation stabilizer BHT in 57.5 parts by weight of n-butyraldehyde was added at a temperature of 40° C. and 82.5 parts by weight of 20% hydrochloric acid were added with stirring at a temperature of 12° C. within 6 min, after which the polyvinyl butyral (PVB) precipitated. The mixture was then held at 12° C. for a further 15 min with stirring, then heated to 73° C. within 80 min and was held at this temperature for 60 min. The PVB was separated after cooling to ambient temperature, washed neutral with water and dried to a solid content of >%. A PVB with a polyvinyl alcohol content of 20.0% by weight and a polyvinyl acetate content of 1.030% by weight was obtained.

362.5 g of PVB, 125 g of the plasticizer 3G8, 12.5 g of the plasticizer DBEA, 0.75 g of the UV stabilizer Tinuvin 328, 0.24 g of a 25% aqueous solution of potassium acetate and 0.1 g of a 25% aqueous solution of magnesium acetate tetrahydrate were mixed in a laboratory mixer (manufacturer: Brabender, model 826801) at 20° C. for 5 min. The mixture obtained was extruded to form a flat film with a thickness of 0.8 mm. Extrusion was carried out using a double-screw extruder with screws rotating in opposite directions (manufacturer: Haake, system Rhecord 90), equipped with a melting pump and a sheet die. The cylinder temperature of the extruder was 220° C., the nozzle temperature was 150° C.

Example 4

100 parts by weight of the polyvinyl alcohol according to comparative example 2 were dissolved in 1075 parts by weight of water with heating to 90° C. A solution of 0.156 parts by weight of the oxidation stabilizer BHT in 57.2 parts by weight of n-butyraldehyde was added at a temperature of 40° C. and 165 parts by weight of 20% hydrochloric acid were added with stirring at a temperature of 12° C. within 6 min, after which the polyvinyl butyral (PVB) precipitated. The mixture was then held at 12° C. for a further 15 min with stirring, then heated to 73° C. within 80 min and was held at this temperature for 240 min. Further work-up was according to comparative example 1. A PVB with a polyvinyl alcohol content of 20.2% by weight was obtained. A film was prepared according to comparative example 2.

TABLE 3

| | CE1 | E1 | E2 | E3 | CE2 | E4 |
|---|---|---|---|---|---|---|
| PVB properties | | | | | | |
| Acid ratio [mol H+/kg PVOH] | 6.03 | 8.99 | 8.99 | 8.99 | 4.53 | 9.05 |
| Final temperature [° C.] | 69 | 73 | 73 | 73 | 73 | 73 |
| Holding time at final temperature [min] | 120 | 240 | 240 | 240 | 60 | 240 |
| Polyvinyl alcohol content PVB [w %] | 14.5 | 15.82 | 14.75 | 15.93 | 20.0 | 20.20 |
| Polyvinyl acetate content PVB [w %] | 1.24 | 0.82 | 1.49 | 1.49 | 1.03 | 1.20 |
| Polyvinyl acetate content PVB [mol %] | 0.94 | 0.62 | 1.13 | 1.12 | 0.76 | 0.88 |
| Degree of acetalisation [w %] | 84.26 | 83.36 | 83.76 | 82.58 | 78.97 | 78.67 |
| Degree of acetalisation [mol %] | 77.53 | 76.08 | 76.99 | 75.4 | 70.45 | 70.06 |
| Molar ratio of 3 continuous syndiotactic vinyl alcohol based on whole of vinyl alcohol groups | 0.081 | 0.154 | 0.136 | 0.145 | 0.146 | 0.187 |
| 3 continous syndiotactic vinyl alcohol groups based on whole of groups (13 C-NMR) [mol %] | 1.61 | 3.55 | 3 | 3.41 | 4.03 | 5.38 |
| Molar ratio of mrrm vinyl alcohol sequences (13 C-NMR) | 0.574 | 0.364 | 0.385 | 0.361 | 0.393 | 0.288 |
| Molar ratio of mrrr vinyl alcohol sequences (13 C-NMR) | 0.255 | 0.387 | 0.373 | 0.386 | 0.397 | 0.408 |
| Molar ratio of rrrr vinyl alcohol sequences (13 C-NMR) | 0.171 | 0.253 | 0.242 | 0.254 | 0.210 | 0.304 |
| OH blockiness VV/(BV + BB) (13C-NMR) | 0.13 | 0.285 | 0.254 | 0.289 | 0.302 | 0.419 |
| Viscosity PVB, 5% sol. In ethanol [mPas] | 75.1 | 90.2 | 81.8 | 85 | 83.7 | 100.5 |
| Film properties | | | | | | |
| Plasticizer type | DINCH | DINCH | DINCH | DINCH | 3G8/DBEA (10:1) | 3G8/DBEA (10:1) |
| plasticizer content [w %] | 26 | 26 | 26 | 26 | 27.5 | 27.5 |
| Creep 100° C. [mm] | 19 | 0.5 | 6.5 | 0.5 | 0 | 0 |
| MFR 100/2 mm/21.6 kg [mg/10 min] | 386 | 45 | 215 | 72 | 229 | 3 |
| MFR 120/2 mm/21.6 kg [g/10 min] | 1.936 | 0.448 | 2.017 | 0.698 | 1.83 | 0.043 |
| MFR 140/2 mm/21.6 kg [g/10 min] | 6.858 | 3.77 | 6.522 | 4.957 | 8.35 | 1.15 |

Comparative Example 3

A plasticized trilayer film was prepared by coextrusion, whereas PVB type CE2 was used in the outer layers each having a thickness of 350 μm and PVB type CE1 was used as the inner layer having a thickness of 130 μm. The plasticizers used for both inner and outer layer was 3G8/DBEA (10:1) and the plasticizer content of the trilayer film was 29% by weight. The plasticizer content of the outer layers was 28% by weight and the plasticizer content of the inner layer was 36%.

Comparative Example 4

A plasticized trilayer film was prepared according to comparative example 3, whereas PVB type E4 was used in the outer layers and PVB type CE1 was used as the inner layer.

Example 5

A plasticized trilayer film was prepared according to comparative example 3, whereas PVB type CE2 was used in the outer layers and PVB type E1 was used as the inner layer.

Example 6

A plasticized trilayer film was prepared according to comparative example 3, whereas PVB type E4 was used in the outer layers and PVB type E1 was used as the inner layer.

Example 7

A plasticized trilayer film was prepared according to comparative example 3, whereas PVB type CE2 was used in the outer layers and PVB type E2 was used as the inner layer.

Example 8

A plasticized trilayer film was prepared according to comparative example 3, whereas PVB type E4 was used in the outer layers and PVB type E2 was used as the inner layer.

Example 9

A plasticized trilayer film was prepared according to comparative example 3, whereas PVB type CE2 was used in the outer layers and PVB type E3 was used as the inner layer.

Example 10

A plasticized trilayer film was prepared according to comparative example 3, whereas PVB type E4 was used in the outer layers and PVB type E3 was used as the inner layer.

Comparative Example 5

A plasticized trilayer film was prepared according to comparative example 3, whereas the plasticizer content of the film was 31% by weight. The plasticizer content of the outer layers was 29% by weight and the plasticizer content of the inner layer was 42%.

Example 11

A plasticized trilayer film was prepared according to example 5, whereas the plasticizer content of the film was 30% by weight.

The properties of the laminated are shown in table 4. Due to the reduced flowability of the inner layer, the examples according to the invention have a lower creep i.e. are mechanically stable at elevated temperature and show a reduced tendency to form bubbles.

TABLE 4

|  | CE3 | CE4 | E5 | E6 | E7 | E8 | E9 | E10 | CE5 | E11 |
|---|---|---|---|---|---|---|---|---|---|---|
| PVB type outer layer | CE2 | E4 | CE2 | E4 | CE2 | E4 | CE2 | E4 | CE2 | CE2 |
| PVB type inner layer | CE1 | CE1 | E1 | E1 | E2 | E2 | E3 | E3 | CE1 | E1 |
| PVB type outer layer | CE2 | E4 | CE2 | E4 | CE2 | E4 | CE2 | E4 | CE2 | CE2 |
| Outer layer thickness/μm | 350 | 350 | 350 | 350 | 350 | 350 | 350 | 350 | 350 | 350 |
| Inner layer thickness/μm | 130 | 130 | 130 | 130 | 130 | 130 | 130 | 130 | 130 | 130 |
| Outer layer thickness/μm | 350 | 350 | 350 | 350 | 350 | 350 | 350 | 350 | 350 | 350 |
| Plasticizer content [w %] | 29 | 29 | 29 | 29 | 29 | 29 | 29 | 29 | 31 | 31 |
| Creep-measurement 100° C. [mm] | 20 | 20 | 2 | 3 | 7 | 6 | 2 | 2 | 20 | 8 |
| Bubble formation test method A | many | many | no | no | few | few | no | no | many | few |

The invention claimed is:

1. A multilayer film comprising at least one first and one second layer of plasticized polyvinyl acetal, wherein the first layer comprises a first plasticizer and a first polyvinyl acetal with a degree of acetalization of 75.1-84.0 mol % and a molar ratio of continuous sequences of vinyl alcohol groups with 5 members with a stereochemical sequence of rrrr of more than 0.23 based on the total amount of continuous syndiotactic sequences of vinyl alcohol groups with 3 members in the polyvinyl acetal and the second layer comprises a second plasticizer and a second polyvinyl acetal with a degree of acetalization of 60-84 mol %.

2. The multilayer film of claim 1, comprising at least one first layer and at least two second layers, wherein a first layer is embedded between two second layers.

3. The multilayer film of claim 1, comprising at least two first layers and at least one second layer, wherein a second layer is embedded between two first layers.

4. The multilayer film of claim 1, wherein the first polyvinyl acetal has a molar ratio of continuous syndiotactic sequences of vinyl alcohol groups with 3 members of at least 0.13 based on the total amount of vinyl alcohol groups in the first polyvinyl acetal.

5. The multilayer film of claim 1, wherein the first polyvinyl acetal has a solution viscosity in a 5% by weight solution in ethanol of more than 80 mPas.

6. The multilayer film of claim 1, wherein the first and/or second polyvinyl acetal has/have a residual acetate content of 0.1 to 8 mol %.

7. The multilayer film of claim 1, wherein the first polyvinyl acetal has a polymerisation degree of less than 2500.

8. The multilayer film of claim 1, wherein the total plasticizer content of the combined layers is from 10 to 42% by weight based on the total weight of the multilayer film.

9. The multilayer film of claim 1, wherein one first layer of polyvinyl acetal comprises 10-60% plasticizer by weight and 90-40 wt. % of the first polyvinyl acetal.

10. The multilayer film of claim 1, wherein one second layer of polyvinyl acetal comprises 10-40% plasticizer by weight and 90-60 wt. % of the second polyvinyl acetal.

11. The multilayer film of claim 1, wherein the film exhibits a surface structure created by melt fracture or by embossing having a surface roughness Rz between 10 and 100 µm.

12. The multilayer film of claim 1, wherein a mixture of the first plasticizer and the first polyvinyl acetal has a melt flow rate at 100° C. (MFR 100) of less than 220 mg/10 min.

13. The multilayer film of claim of claim 1, which has a wedged-shaped profile.

* * * * *